United States Patent
Files et al.

(10) Patent No.: US 10,635,196 B1
(45) Date of Patent: Apr. 28, 2020

(54) INFORMATION HANDLING SYSTEM POWER MANAGEMENT WITH ACTIVE STYLUS INPUT DEVICE

(71) Applicant: Dell Products L.P., Round Rock, TX (US)

(72) Inventors: Jace W. Files, Round Rock, TX (US); John Trevor Morrison, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/151,463

(22) Filed: Oct. 4, 2018

(51) Int. Cl.
G06F 3/0354 (2013.01)
G06F 3/038 (2013.01)
G06F 1/3215 (2019.01)
G06F 1/3212 (2019.01)
G06F 1/3287 (2019.01)

(52) U.S. Cl.
CPC ........ *G06F 3/03545* (2013.01); *G06F 1/3212* (2013.01); *G06F 1/3215* (2013.01); *G06F 1/3287* (2013.01); *G06F 3/0383* (2013.01)

(58) Field of Classification Search
CPC .. G06F 3/03545; G06F 1/3212; G06F 1/3215; G06F 1/3287; G06F 3/0383
See application file for complete search history.

(56) References Cited

U.S. PATENT DOCUMENTS

| | | | |
|---|---|---|---|
| 5,195,668 A | * | 3/1993 | Kunes .................. B60R 7/05 224/312 |
| 6,437,543 B1 | | 8/2002 | Oler et al. |
| 7,414,389 B2 | | 8/2008 | Nguyen |
| 9,081,569 B2 | | 7/2015 | Mercea et al. |
| 9,210,662 B1 | | 12/2015 | Brown et al. |
| 2009/0141008 A1 | * | 6/2009 | Johnson .................. G06F 3/041 345/179 |
| 2011/0162894 A1 | * | 7/2011 | Weber ................ G06F 3/03545 178/19.03 |
| 2015/0277592 A1 | | 10/2015 | Nishigaki |
| 2015/0378455 A1 | * | 12/2015 | Immel ................ G06F 3/03545 345/179 |
| 2017/0068339 A1 | * | 3/2017 | Zimmerman ....... G06F 3/04162 |

* cited by examiner

*Primary Examiner* — Charles V Hicks
(74) *Attorney, Agent, or Firm* — Zagorin Cave LLP; Robert W. Holland (57) ABSTRACT

A portable information handling system accepts inputs at a touchscreen display with a stylus having an active tip powered by a battery. The stylus garages in a stylus dock having a magnet that generates a magnetic field detected by a sensor in the stylus that cuts off the battery from powering the active tip. The portable information handling system detects that battery power is cut off at the stylus and adjusts processing to disable stylus detection and/or tracing functions to save power and memory resources.

20 Claims, 5 Drawing Sheets

INFORMATION HANDLING SYSTEM POWER MANAGEMENT WITH ACTIVE STYLUS INPUT DEVICE

BACKGROUND OF THE INVENTION

Field of the Invention

The present invention relates in general to the field of information handling system power management, and more particularly to an information handling system power management with active stylus input device.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems generally integrate a power source, such as a battery, and a display, such as a flat panel touchscreen display, to allow end users to interact with the system without cables to external power or housing with a touchscreen display on one side that acts as both an output device to present information as visual images and an input device to accept end user inputs as touches. For example, tablet information handling systems present a keyboard so that an end user can type inputs at the touchscreen display. Although touchscreen displays offer a convenient interface to accept inputs at a portable information handling system, the lack of physical feedback from moving keys tends to hamper the speed and accuracy at which end users interact with the system.

One alternative to typed inputs at a touchscreen display is traced inputs, such as tracing letters and/or words that are translated by processing resources of the information handling system into input values. For example, an end user finger trace across a touchscreen display is translated into words and output as typed values in a word processing application. A difficulty with using a finger to trace inputs is that the width of a finger across a touchscreen display tends to be imprecise so that the output may not accurately reflect an end user's intended input. Another alternative for tracing inputs is a stylus that has a smaller contact point at the touchscreen display to offer the end user a more precise input trace. The end user writes on the touchscreen with the stylus much like writing on paper with a pen. End users may also use the stylus to draw figures, with the information handling system interpreting the trace with color and size characteristics selected by the end user.

To improve stylus detection and precision at a touchscreen display, stylus input tips sometimes include an active signal that generates a waveform identifiable by a touchscreen display touch controller. An advantage of an identifiable active signal is that multiple different stylus devices may make inputs at the touchscreen display with each stylus device having its own associated input characteristics. To coordinate assignable active waveforms, stylus devices sometimes include Bluetooth or other wireless communication interfaces that share input characteristics with the information handling system. For example, a stylus may store characteristics so that each time an end user initiates use of the stylus, a wireless communication of the characteristics allows the information handling system to interpret the inputs in a consistent manner, such as the same color or width of the input trace presented at the touchscreen display. A variety of standards have attempted to define such stylus interactions, such as the Universal Stylus Initiative (USI), the Active ElectroStatic 2.0 standard (AES2.0) and the Microsoft Pen Protocol (MPP).

A difficulty with active stylus devices is that a battery or supercapacitor is generally included in the stylus to support an active waveform and wireless interface. Ideally, a stylus battery should last for an extended time period without a recharge, such as for a year. Battery life may be extended in a stylus by placing the active waveform and wireless interface into a standby state when not in use. Generally, over the desired battery life, the stylus will remain in the standby mode for the majority of the time. Power consumption in the quiescent state is minimal, such as 45 microAmps of current compared with 490 microAmps during active use. In one example embodiment, a battery with 688 mWhr capacity will last 182 days under expected active and sleep states.

SUMMARY OF THE INVENTION

Therefore, a need has arisen for a system and method which manages power consumption of an active stylus input device.

In accordance with the present invention, a system and method are provided which substantially reduce the disadvantages and problems associated with previous methods and systems to manage power consumption of an active stylus input device. A stylus battery disconnects during non-use, such as when garaged in a stylus dock at an information handling system, and reconnects during use so that battery life is extended at the stylus.

More specifically, an information handling system includes processing components to process information, such as executing instructions of an operating system and applications, and present the information as visual images at a touchscreen display. A stylus inputs information with touches of an active tip to the touchscreen display, such as by providing a waveform from a processor through a conductive tip to a capacitive touchscreen surface. The stylus powers the active tip with a battery that powers a processor and wireless transceiver, such as a Bluetooth transceiver. A sensor of the stylus detects placement in a stylus dock of the information handling system and, in response, cuts off power from the battery to remove current draw by the processor and active tip. At removal of the stylus from the stylus dock, the battery reconnects to provide power to the processor and active tip. In one example embodiment, the sensor is a reed switch that disconnects the battery if a predetermined magnetic field is detected, such as a magnet associated with the stylus dock. In another example embodiment, the information handling system detects docking of the stylus and, in response, disables stylus functions of the information handling system, such as stylus detecting and tracking at the touchscreen display, to reduce power consumption and processing resource use at the information handling system.

The present invention provides a number of important technical advantages. One example of an important technical advantage is that an active stylus input device has an increased battery life by reducing or eliminating power consumption when the stylus is not in use. The battery of the stylus automatically disconnects from power consuming components in the sleep state so that current draw from the battery by the power consuming components is eliminated. In the example described above, disconnecting the battery when in standby mode extended the battery from 182 days of life to 299 days. Transitioning automatically from the standby to an active state based upon an indication of use, such as removal of the stylus from a garage, ensures that usage of the stylus will not be impacted by power saving in the standby mode when the end user renews usage of the stylus.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system stylus disconnects a battery when garaged and reconnects the battery when in use to extend battery life. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
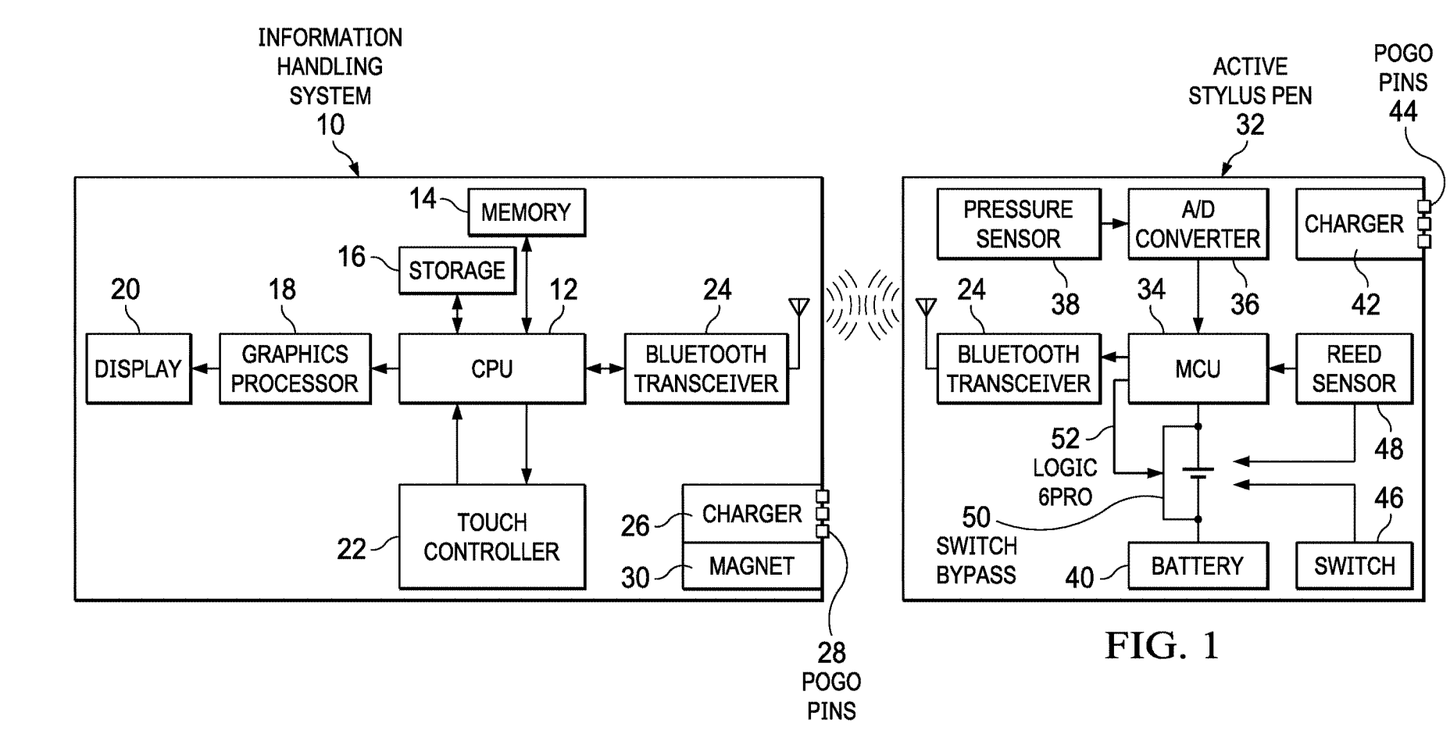
FIG. 1 depicts a block diagram of a portable information handling system 10 and stylus 32 that manage power consumption based upon whether the stylus is coupled to or separate from a stylus dock.

Referring now to FIG. 1, a block diagram depicts a portable information handling system 10 and stylus 32 that manage power consumption based upon whether stylus 32 is coupled to or separate from a stylus dock. Information handling system 10 executes instructions on a central processing unit (CPU) 12 to process information with the instructions and information stored in a memory 14, such as a random access memory (RAM). For example, an operating system and applications stored in persistent storage 16, such as a solid state drive (SSD), are retrieved to memory 14 to execute on CPU 12 and present output as visual images generated by a graphics processor 18 at a touchscreen display 20. An end user interacts with CPU 12 through touches made at touchscreen display 20 that are reported by a touch controller 22 to CPU 12. Alternatively, a Bluetooth transceiver 24 interacts with external peripherals to accept inputs, such as a wireless keyboard and mouse.

Active stylus 32 makes touch inputs to touchscreen 20 through a tip contact point with an end user writing on touchscreen 20 using active stylus 32 as a pen. A microcontroller unit (MCU) 34, such as system on chip (SOC), or other processing resource, executes embedded code to generate an active waveform signal at a conductive tip of stylus 32. For example, MCU 34 creates a waveform analog signal when a pressure sensor 38 provides through an analog to digital converter 36 an indication of a press by the conductive tip against a writing surface. MCU 34 interfaces with a Bluetooth transceiver 24 to wireless communication with the Bluetooth transceiver of information handling system 10. For example, stylus 32 stores writing characteristics, such as signal waveform characteristics, color and thickness, set through information handling system 10 and communicated by information handling system 10, and provides the writing characteristics to information handling system 10 at initiation of use of stylus 32.

Stylus 32 is powered by a battery 40 that provides current to MCU 34 and other components that support an active waveform at the conductive tip. Current draw from battery 40 is greatest during generation of the active waveform and wireless communication. When stylus 32 is not generating an active waveform or communicating wirelessly, current draw is reduced by standby power savings of MCU 34 that creates a low power quiescent state. To further reduce current draw, a switch 46 selectively cuts off battery 40 from providing current to MCU 34 or other components that create a signal waveform at the conductive tip. Disconnecting battery 40 eliminates the passive draw of components in the quiescent state, such as when MCU 34 waits for a GPIO signal; however, without any power to MCU 34, a GPIO input will not awaken the processor.

To manage power consumption during stylus standby and wake, a reed sensor 48 or other sensor interfaces with switch 46 so that battery 40 is disconnected when stylus 32 is docked and reconnected when stylus 32 is not docked. When stylus 32 is docked, an end user generally cannot make inputs with the stylus active tip so that disconnecting the battery saves power without impacting use of stylus 32. When stylus 32 is not docked, battery 40 is connected so that stylus 32 remains in a low power standby mode until a sensed pressure initiates an active waveform mode. In the example embodiment, reed sensor 48 detects a magnetic field of a magnet 30 associated with a dock to information handling system 10 to disconnect battery 40 if the magnet is proximate and reconnects to battery 40 if the magnet is distal. For instance, reed sensor 48 may integrate with switch 46 to automatically disconnect or reconnect battery 40 based upon the presence of a magnetic field from magnet 30. In alternative or in addition, reed sensor 48 may provide a signal to MCU 34 that indicates when reed sensor 48 detects a magnetic field and causes switch 46 to disconnect battery 40. In the example embodiment, a bypass switch 50 controlled by MCU 34 selectively maintains a connection of battery 40 to MCU 34 even when a magnetic field causes switch 46 to disconnect battery 40. For instance, MCU 34 may maintain power after switch 46 disconnects battery 40 to send a Bluetooth signal through transceiver 24 to information handling system 10 and then command bypass switch 50 to disconnect battery 40. This allows information handling system 10 to configure to save power by sleeping or disabling hardware, firmware and/or software components associated with detecting and analyzing stylus 32 inputs at touchscreen display 20. In addition, pressure sensor 38 may activate bypass switch 50, such as with current provided from a capacitor, when use of stylus 32 is detected so that battery 40 will reconnect. In one embodiment bypass switch 50 may be a mux/demux that selects a path for current out of battery 40 based upon a command from MCU 34. In alternative embodiments, alternative circuits and logic may be used to selectively disconnect and reconnect battery 40 based upon detection of a magnetic field and/or pressure sensor indications of use. For example, a Hall sensor may detect the magnetic field in the place of the reed switch.

In one example embodiment, information handling system 10 detects docking of stylus 32 and, in response, reconfigures processing resources to reduce power and memory use when stylus detection and tracking from the docked stylus is unlikely. For example, if graphics processor 18 uses iPT to perform stylus processing, those processing elements may be slept to save power. Similarly, touch controller 22 may use a lower scan rate where higher precision stylus inputs are not expected. Further, operating system and application logic related to stylus tracking may be disabled to save memory for allocation to other functions, such as heat map processing for palm rejection. In the example embodiment, a charger 26 may provide power to charge stylus 32 through pogo pins 28 that interface with pogo pins 44 and a charger 42 of stylus 32. Through Bluetooth communications, information handling system 10 may keep battery 40 connected with bypass switch 50 during charging and then command disconnect once charge is complete. The various battery disconnect options offer predictable power savings with battery disconnect at each stylus dock where an information handling system is not configured to provide more detailed power control while leaving discrete battery disconnect control available if wireless communication is available.

Figure 2:
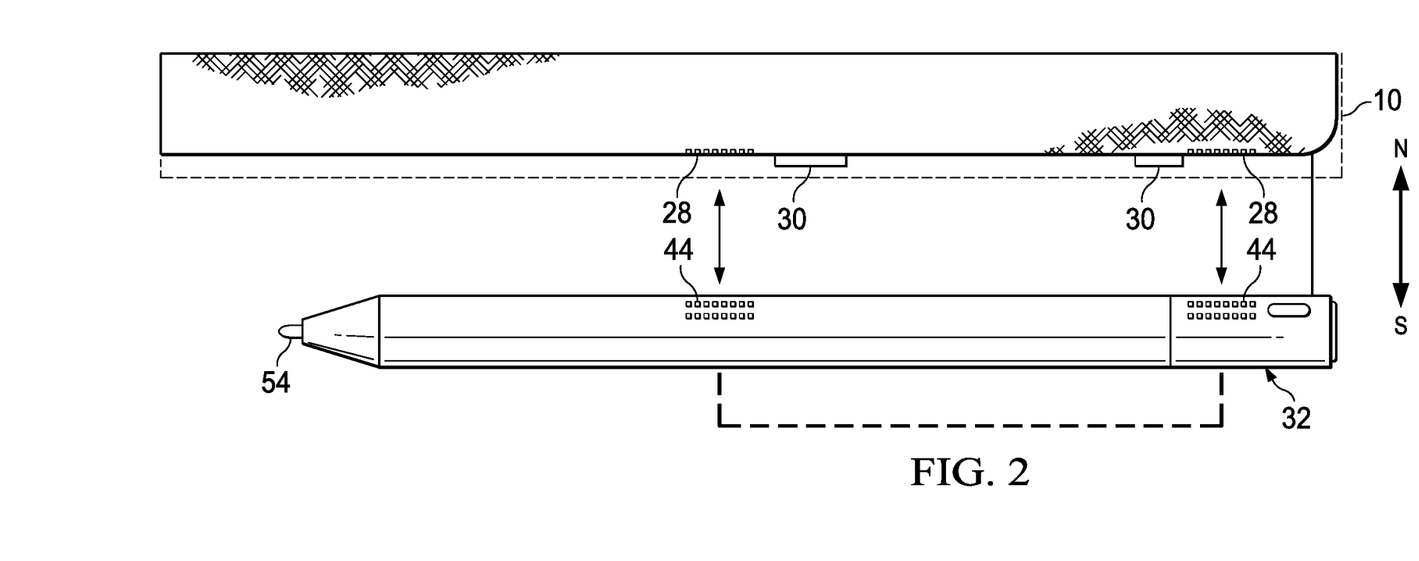
FIG. 2 depicts an example embodiment of a stylus aligned to couple to a portable information handling system housing.

Referring now to FIG. 2, an example embodiment depicts a stylus 32 aligned to couple to a portable information handling system 10 housing. In the example embodiment, stylus 32 illustrates a contact tip 54 that does not have pressure placed on it during a dock to information handling system 10 performed with magnetic attraction provided by a magnet 30. Pogo pins 28 and 44 align in the docked position and, in one embodiment, may also indicate a dock with magnets or by a signal interface. As is described below in greater detail, other types of docking structures may be used to dock stylus 32 as may other indications that a dock has occurred, such as physical switch activated in stylus 32 in response to a coupling at a defined dock.

Figure 3:
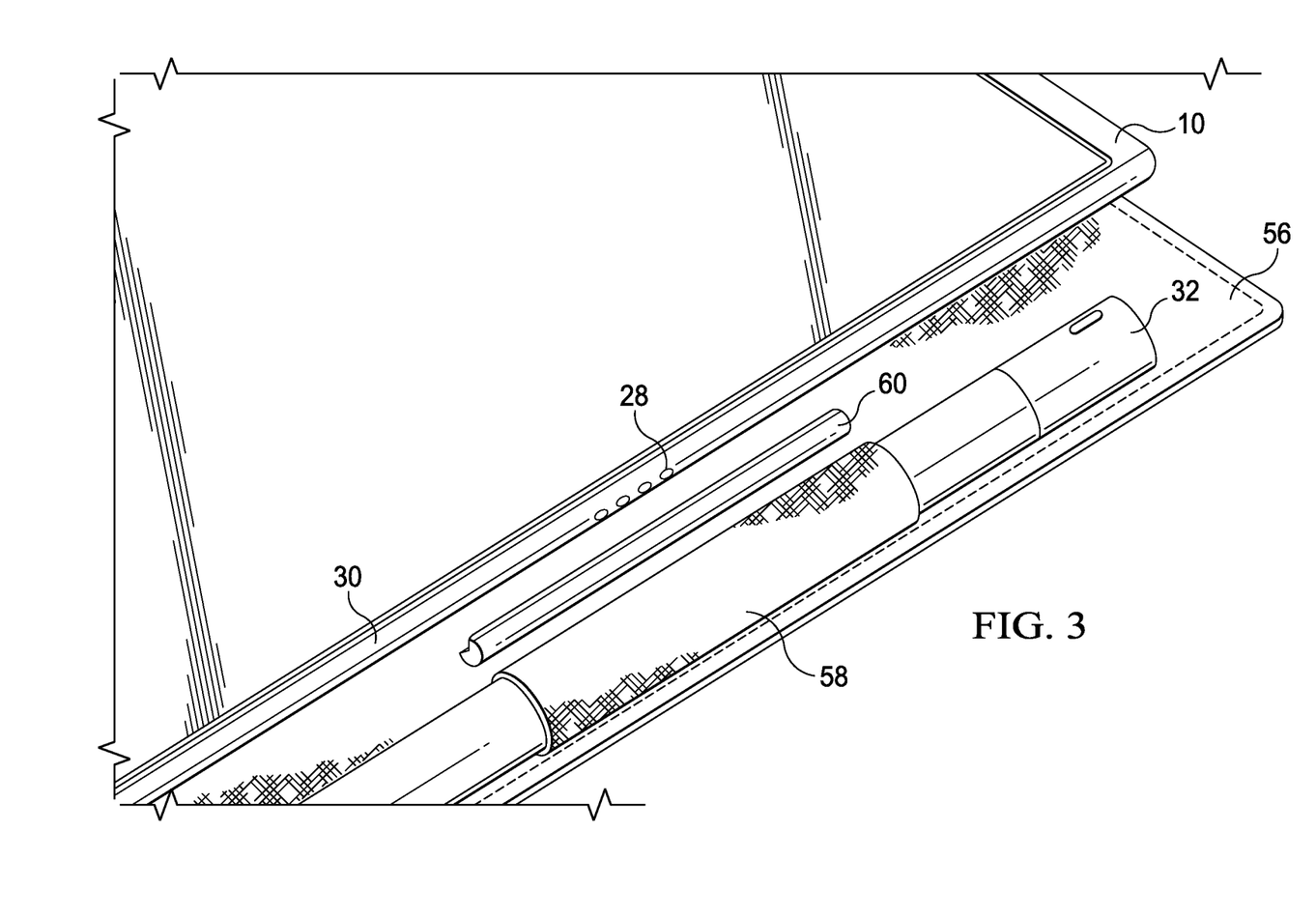
FIG. 3 depicts a side perspective view of a portable information handling system coupled to a cloth cover having a stylus inserted in a cloth tube dock.

Referring now to FIG. 3, a side perspective view depicts a portable information handling system 10 coupled to a cloth cover 56 having a stylus 32 inserted in a cloth tube dock 58. Cloth tube dock 58 integrates with a docking element 60 that has a magnet aligned to provide a magnetic field to stylus 32 that disconnects battery 40. When stylus 32 inserts into tube 58, the magnet of docking element 60 disconnects the battery within stylus 32 whether or not information handling system 10 is inserted in cloth cover 56. When cloth cover 56 accepts information handling system 10, docking element 60 couples by magnetic attraction to information handling system 10. In the example embodiment, pogo pins 28 provide a physical interface between information handling system 10 and stylus 32 through docking element 60, such as to communicate power to charge stylus 32.

Figure 4:
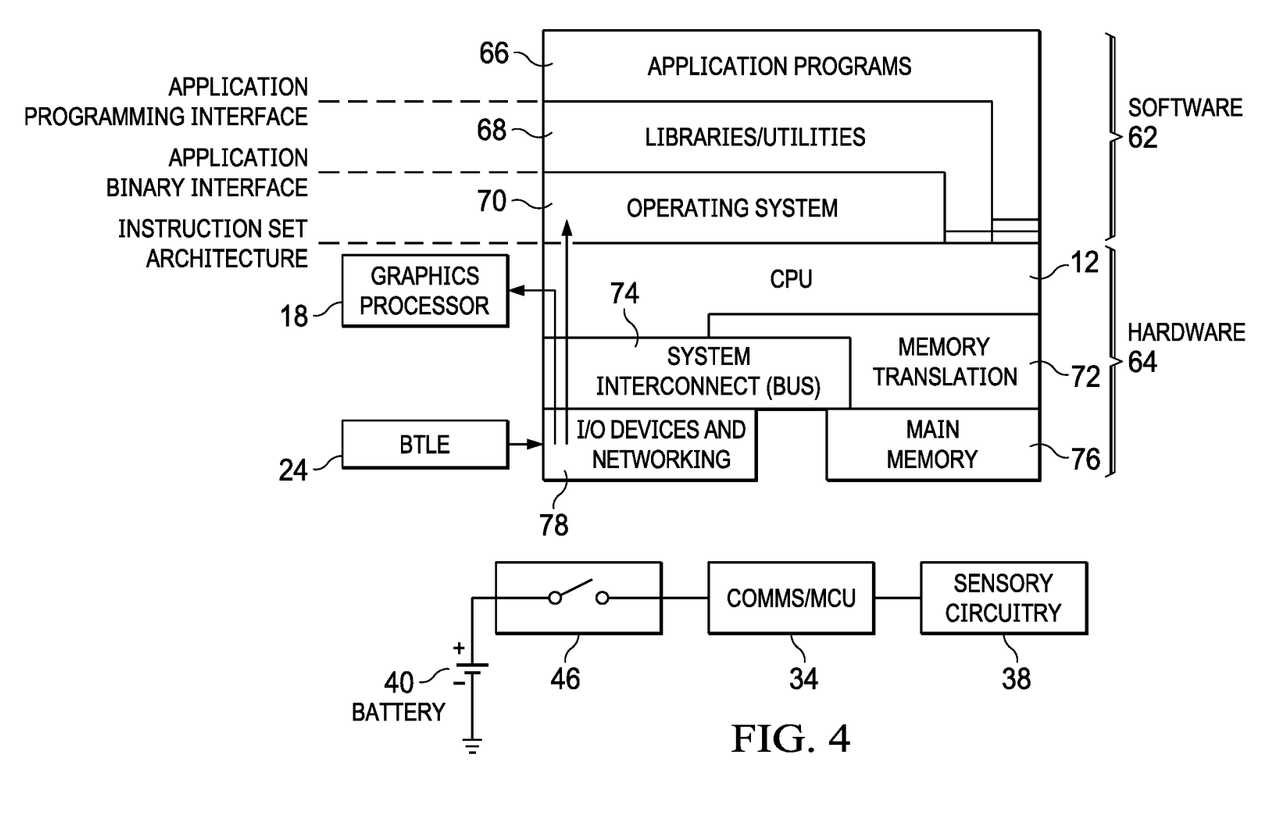
FIG. 4 depicts a block diagram of hardware, firmware and software layers for managing power consumption of an information handling system and stylus.

Referring now to FIG. 4, a block diagram depicts hardware, firmware and software layers for managing power consumption of an information handling system 10 and stylus 32. An application program layer 66 executes applications over a library and utility layer 68 and operating system layer 70. As an inactive stylus is detected, applications, utilities and operating system functions associated with stylus detection and tracking are disabled to reduce power consumption and free up memory and processing capabilities. For example, palm rejection logic specific to pen use may be disabled while other touch rejection algorithms specific to finger inputs remain enabled. Similarly, as stylus removal from the dock is detected, touch rejection logic associated with finger inputs may be disabled while stylus specific logic is loaded and executed. In one embodiment, heat detection of a palm resting on the touchscreen display in a writing position is enabled with stylus undocking and disabled with stylus docking. By focusing processing resources on the most likely inputs type, power and processing resources are reserved to provide an improved response to end user interactions. In this manner, CPU 12, memory 76, interconnect buses 74, graphics processor 18 and I/O devices 78 are applied in a more efficient manner. Information handling system 10 configuration is managed with communications logic of MCU 34 in stylus 32, such as through Bluetooth communications.

Figure 5:
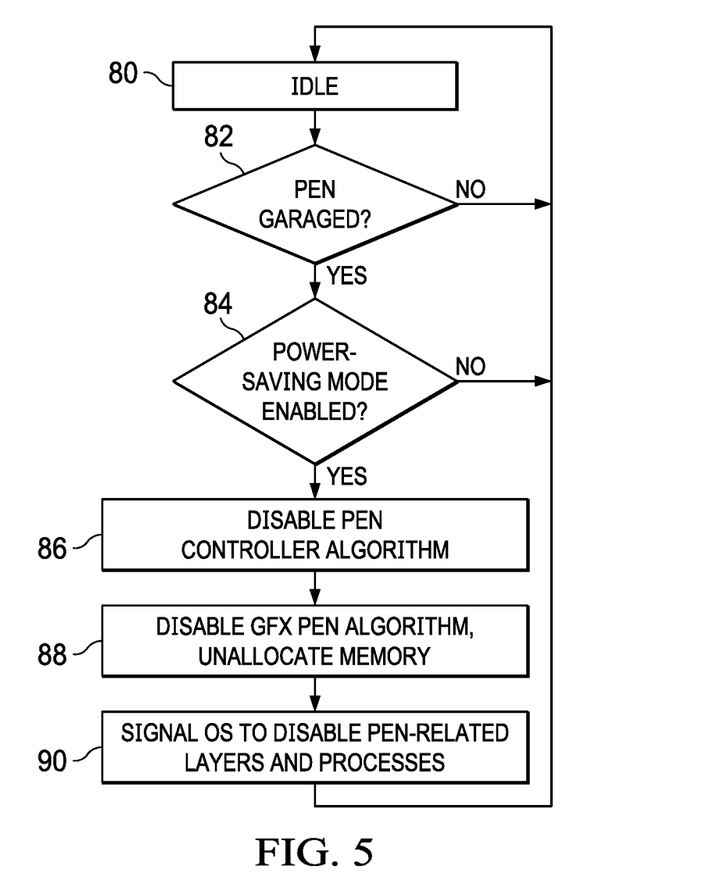
FIG. 5 depicts a flow diagram of a process for managing power consumption of an information handling system that detects docking of a stylus.

Referring now to FIG. 5, a flow diagram depicts a process for managing power consumption of an information handling system that detects docking of a stylus. The process starts at step 80 in an idle state of the information handling system and at step 82 with start of use of the system a determination is made of whether the stylus is garaged. If not, the process continues to step 82 to monitor for a change of the stylus status to docked. Tracking stylus status as docked or undocked may be done in memory as information handling system remains in a waked state or may be updated by Bluetooth queries to the stylus from the information handling system. If at step 82 the stylus is docked, the process continues to step 84 to determine if a power savings mode is enabled at the information handling system. For instance, when external power is available at the information handling system power savings may be disabled while, when operating on battery power, power savings may be enabled to lengthen battery life at the information handling system. If power savings are enabled at step 84, the process continues to step 86 to initiate power savings at the information handling system. At step 86, the pen controller algorithm is disabled to reduce memory and power use. At step 88, the graphics controller pen algorithm is disabled and memory associated with the graphics controller is unallocated. At step 90, the operating system disables stylus-related layers and processes to save memory and power consumption. In various embodiments, other power and processing resource reductions may be enforced based upon anticipated system use with the stylus garaged. The process then returns to step 80 to monitor stylus docking so that stylus functions are restored if the stylus is removed from the dock.

Although the present invention has been described in detail, it should be understood that various changes, substitutions and alterations can be made hereto without departing from the spirit and scope of the invention as defined by the appended claims.

What is claimed is:

1. An information handling system comprising:
a portable housing;
a processor disposed in the housing and operable to execute instructions that process information;
a memory disposed in the housing and interfaced with the processor, the memory operable to store the instructions and information;
a touchscreen display interfaced with processor and operable to present the information as visual images and detect touches as inputs;
a stylus dock coupled to the housing and configured to hold a stylus; and
a stylus configured to couple to the stylus dock, the stylus having a processor interfaced with an active tip, the active tip generating a waveform, the processor and active tip powered by a battery, and a battery cutoff switch that disconnects the battery from the processor and active tip at a coupling of the stylus to the stylus dock.

2. The information handling system of claim 1 further comprising:
a magnet disposed at the stylus dock;
wherein the cutoff switch comprises a reed switch that disconnects the battery when in proximity to the magnet.

3. The information handling system of claim 2 further comprising:
a bypass switch interfaced with the processor and battery, the bypass switch maintaining power from the battery to the processor if the reed switch disconnects the battery, the processor operable to cut off power through the bypass switch through a General Purpose Input Output (GPIO) protocol.

4. The information handling system of claim 3 further comprising:
a wireless interface disposed in the stylus; and
a wireless interface disposed in the housing, the stylus wireless interface communicating to the information handling system wireless interface when the reed switch cuts off power and before the bypass switch cuts off power.

5. The information handling system of claim 4 wherein:
the reed switch reconnects the battery power to the active tip when the magnet moves distal the reed switch; and
the stylus wireless interface communicates the battery reconnect to the information handling system wireless interface.

6. The information handling system of claim 5 further comprising power saving logic executing on the processor and disabling stylus tracking logic of the touchscreen display in response to a wireless communication of a battery disconnect at the stylus.

7. The information handling system of claim 6 wherein the power saving logic enables stylus tracking logic of the touchscreen display in response to a wireless communication of a battery reconnect at the stylus.

8. The information handling system of claim 5 further comprising:
a graphics processor interfaced with the touchscreen display and processor to process the information for presentation at the touchscreen display, the graphics processor having logic that identifies stylus touches at the touchscreen, the logic disabled when the stylus battery disconnects and enabled when the stylus battery reconnects.

9. The information handling system of claim 1 further comprising:
a cloth cover disposed over the housing;
wherein the stylus dock comprise a tube formed in the cloth cover.

10. A method for managing power at an information handling system stylus, the method comprising:
powering a processor and an active tip of the stylus with a battery integrated in the stylus;
generating an active wave form with the processor at the active tip to enhance detection of the active tip at a capacitive touch detection device;
coupling the stylus to a stylus dock associated with an information handling system; and
in response to the coupling, disconnecting the battery from the processor and active tip with a switch disposed between the battery and the processor, the switch disconnecting the battery and processor.

11. The method of claim 10 further comprising:
detecting the coupling at the information handling system; and
in response to the detecting, adjusting monitoring for stylus touches by the information handling system.

12. The method of claim 11 wherein disabling monitoring for stylus touches further comprises:
reducing a touch detection scan rate at a touchscreen of the information handling system; and
disabling stylus touch detection logic associated with the touchscreen.

13. The method of claim 12 wherein detecting further comprises:
sending a wireless communication from the stylus to the information handling system before the disconnecting the battery; and
applying the wireless communication to determine coupling of the stylus at the information handling system.

14. The method of claim 10 further comprising:
integrating a magnet in the stylus dock; and
disconnecting the battery with a reed switch integrated in the stylus and proximate the magnet at the coupling to the stylus dock.

15. The method of claim 10 further comprising:
removing the stylus from the stylus dock; and
in response to the removing, reconnecting the battery.

16. The method of claim 15 wherein the stylus port comprises a tube coupled to a cloth cover around the information handling system.

17. A stylus comprising:
a processor;
a conductive tip, the processor providing a waveform to the conductive tip based upon an output of the processor;
a battery configured to power the processor and the waveform to the conductive tip; and a reed switch interfaced with the battery to cut off power from battery to the processor and the conductive tip in the presence of a predetermined magnetic field and to provide power from the battery to the processor and conductive tip in the absence of the predetermined magnetic field.

18. The stylus of claim 17 further comprising a bypass switch that maintains power to the processor in the presence of a magnetic field, the bypass switch controlled by the processor.

19. The stylus of claim 18 further comprising:
a wireless transceiver interfaced with the processor;
wherein the processor communicates with the wireless transceiver the disconnect of the battery before cutting of power with the bypass switch.

20. The stylus of claim 19 further comprising:
a pressure sensor at the capacitive tip interfaced with the bypass switch;
wherein pressure sensed at the pressure sensor connects the battery at the bypass switch.

\* \* \* \* \*